United States Patent [19]

Arnaud

[11] Patent Number: 5,647,977
[45] Date of Patent: Jul. 15, 1997

[54] METHOD AND APPARATUS FOR REMOVING CONTAMINANTS FROM INDUSTRIAL WASTE WATER

[75] Inventor: Johnny Arnaud, Houston, Tex.

[73] Assignee: Hydrotreat, Inc., Houston, Tex.

[21] Appl. No.: 349,351

[22] Filed: Dec. 5, 1994

[51] Int. Cl.$^6$ ............................... C02F 9/00; C02F 1/24; C02F 1/28

[52] U.S. Cl. ............ 210/167; 210/195.1; 210/196; 210/202; 210/205; 210/221.2; 210/207; 210/259; 210/262; 210/266; 210/269; 210/521; 134/111; 134/123

[58] Field of Search ............................ 210/167, 195.1, 210/196, 197, 201, 202, 205, 206, 220, 221.2, 207, 258, 259, 262, 265, 266, 269, 294, 521; 134/111, 123

[56] References Cited

U.S. PATENT DOCUMENTS

| | | |
|---|---|---|
| 2,922,173 | 1/1960 | Lind et al. . |
| 3,192,155 | 6/1965 | Bready et al. . |
| 3,306,456 | 2/1967 | Fromson et al. . |
| 3,384,239 | 5/1968 | Berardi . |
| 3,616,917 | 11/1971 | Hellwege . |
| 3,774,625 | 11/1973 | Wiltrout . |
| 3,810,544 | 5/1974 | Armstrong . |
| 3,850,805 | 11/1974 | Armstrong . |
| 3,923,658 | 12/1975 | Lancaster . |
| 3,932,282 | 1/1976 | Ettelt . |
| 3,992,300 | 11/1976 | Hill . |
| 4,066,540 | 1/1978 | Wada et al. . |
| 4,104,164 | 8/1978 | Chelton . |
| 4,145,279 | 3/1979 | Selby, III . |
| 4,491,549 | 1/1985 | Fischer et al. . |
| 4,652,368 | 3/1987 | Ennis . |
| 4,690,756 | 9/1987 | Van Ry . |
| 4,921,609 | 5/1990 | Fromson . |
| 4,956,080 | 9/1990 | Josefik . |
| 5,147,534 | 9/1992 | Rymal, Jr. . |
| 5,242,604 | 9/1993 | Young . |
| 5,374,352 | 12/1994 | Pattee . |
| 5,413,128 | 5/1995 | Butts . |
| 5,458,778 | 10/1995 | Stuckmann . |

OTHER PUBLICATIONS

Fink, Ronald G. "Catalytic Oxidation Process one answer to car wash woes", Water Conditioning & Purification, pp. 64–69 Nov. 1994.
Stansbury, Suzanne "Carwashes Reclaim Water, Save Money", Water Technology, pp. 75–77 Oct. 1994.
Environmental Pretreatment Systems; "EPS P 205 Portable Treatment System" (undated).
Environmental Pretreatment Systems; "System Specifications" (undated).
Treatment Technologies, Inc.; "MicroSep" (undated).
WWS, Inc.; "Recyclo–Sep Waste Water Recycler" (undated).
Simpson Filtration, Inc.; "the wash water solution" (undated).
Jim Coleman Company; "Industrial Washing Equipment" (undated).
WaterCycle, Ltd.; "A Water Recovery Company" (undated).
National Fluid Separators, Inc.; "OilMaster Separates Oil & Water" (undated).
B T Technologies, Inc.; "Centri–Matic The Water Reclaim Unit for the 1990's" (undated).
The Rockland Corporation; "Rockett Self–Contained, Skid–Mounted Water Purifiers" (undated).

(List continued on next page.)

*Primary Examiner*—Thomas M. Lithgow
*Attorney, Agent, or Firm*—Arnold, White & Durkee

[57] ABSTRACT

A system is provided for removing impurities anticipated to be found in industrial waste water, which system is particularly well suited for waste water systems such as those used for laundry or vehicle washing operations. The system includes aeration, mixing/flocculating, and contact media mechanisms to remove suspended solids, hydrocarbons, organic materials and undesired dissolved minerals from the treated water.

23 Claims, 15 Drawing Sheets

OTHER PUBLICATIONS

Sanborn/Aquatec, Inc.; "Membrane Systems for Environmental Markets" (undated).

Thermal Engineering of Arizona, Inc.; "Rinse Water Reuse" (undated).

Memtek; "Advanced Membrane Filtration Wastewater Treatment Components E–Series" (undated).

Tri–Mark Metal Corporation; "Tri–Mark Metal Corporation Water Treatment Systems" (undated).

Norchem Corporation; "Nordaf Dissolved Air Floatation for Wastewater" (undated).

Sunset Technologies, Inc.; "The Sunset SRS 444/666 Water Recycling System" (undated).

Johnson Systems, Inc.; "Electrolytic Process Treatment Water Recycle/Reuse Technology" (undated).

RGF Environmental Systems, Inc.; "Ultrasorb, The Pollution Solution" (undated).

Specialty Equipment Co., Inc.; "Cyclo–Tron Waste Water Filtration System" (undated).

Specialty Equipment Co., Inc.; "Filtron II Media Filtration Plant" (undated).

Specialty Equipment Co., Inc.; "Emulsitron, Eliminates Your Waste Water Problems" (undated).

Specialty Equipment Co., Inc.; "The Eliminator" (undated).

Ryko Manufacturing Company; "The Environmentalist II–A" (undated).

Ryko Manufacturing Company; "Rainmaker II Reverse Osmosis Rinse System" (undated).

Apollo Ultrapure Water Systems Incorporated; "Apollo Ultrapure Water Systems" (undated).

Apollo Ultrapure Water Systems Incorporated; "Sidewinder Model" (undated).

Apollo Ultrapure Water Systems Incorporated; "Model 3510G" (undated).

Sobrite Technologies, Inc.; "Showroom condition in less time with spot–free water!" (undated).

Sobrite Technologies, Inc.; "Industrial Reverse Osmosis Equipment" (undated).

Ford (Motor Co.,) Customer Service Division; "Rotunda An Exciting Breakthrough in Vehicle Washing" (undated).

Ford (Motor Co.) Parts & Service Division; "Rotunda Spot–Free Portable Wash System" (undated).

Baryon Environmental; "Clarifies Wastewater & Gets the Oil Out!" (undated).

IEECO, Inc.; "The Oil Coffin" (undated).

Americleer Corporation; "Americleer, 'We're changing the world of recycled water', Advance Water Reclamation Technology" (undated).

Continental Equipment Co.; "Recycling Water is our only business." (undated).

Continental Equipment International; "Design–Built Systems for the World's Water" (undated).

RGF Environmental Systems, Inc.; "Innovative Pollution Solutions" (undated).

Landa, Inc.; "Water Maze Delta, Economical Wash–Water Recycling" (undated).

Landa, Inc.; "Water Maze Fact Sheet" (undated).

Landa, Inc.; "Alpha, Slickest Oil–Water Separator in the Industry" (undated).

Landa, Inc.; "Warer–Maze, The water treatment solution is clear" (undated).

Environmental Protection Agency; "Does your facility generate automotive service wastes?" (undated).

Environmental Protection Agency; "Does Your Facility Generate, Industrial Wastewaters?" (undated).

J H Systems; "Wash 20–30 Cars Per Hour With Spot–Free Water" (undated).

Environmental Cleaning Systems Inc..; "Latimat Wash Pad" (undated).

Liquid Recovery Corporation/Division of N/S; "Water Recovery Doesn't Cost–It Pays" (undated).

N/S Corporation; "Spot–Free Rinse System" (undated).

Hydrotreat, Inc.; "Fibersorb" (undated).

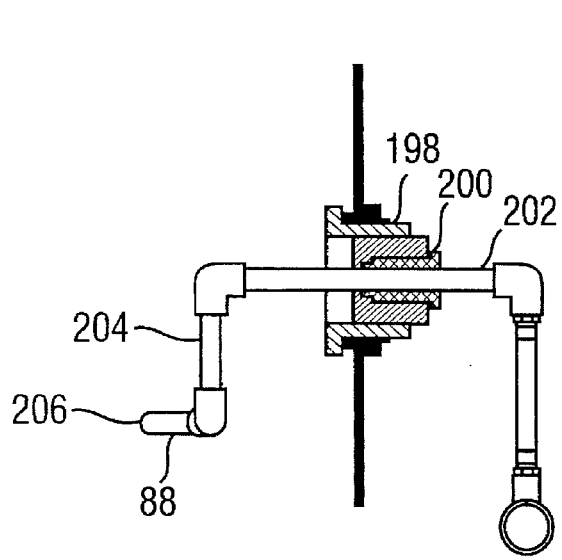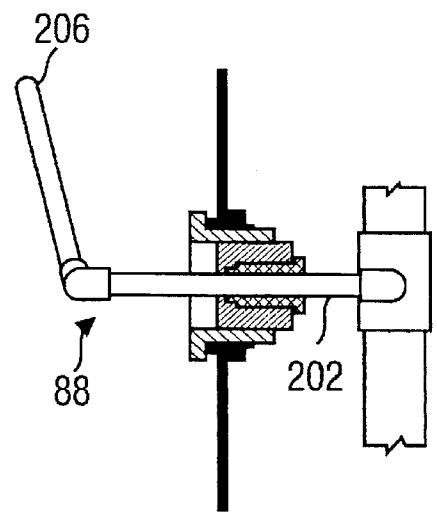
FIG. 8A    FIG. 8B
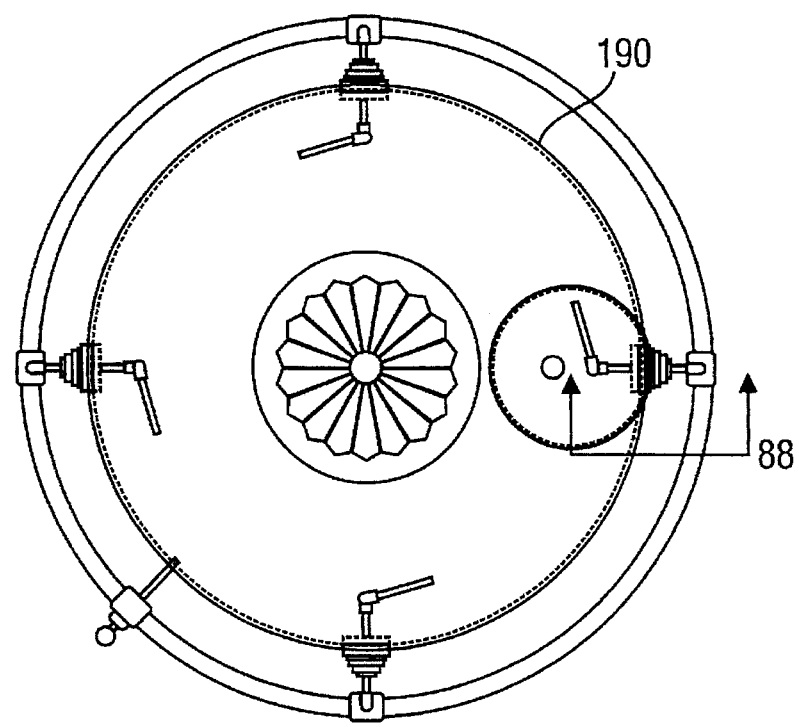
FIG. 9

METHOD AND APPARATUS FOR REMOVING CONTAMINANTS FROM INDUSTRIAL WASTE WATER

BACKGROUND OF THE INVENTION

The present invention relates generally to methods and apparatus for treating industrial waste matter, and more specifically relates to methods and apparatus for removing contaminants from such water, having particular applicability to treatment of waste water from vehicle washing, laundries and similar operations.

The recovery of waste water from industrial operations is presenting an increasing problem relative to environmental and governmental concerns. The impact upon the environment by water used in industrial operations, including vehicle washing operations, is being recognized as an increasing problem. Accordingly, governmental regulations, at both the local and federal level, are being put into place to require the clean up of industrial water prior to release to the environment or into a public sewer system.

Several significant problems are presented in the clean up of industrial waters. These are exemplified by the problems with the cleaning of waters used in vehicle washing operations. Accordingly, the present invention will be discussed in relation to such systems. Water used for vehicle washing typically contains significant amounts of suspended solids; and will also contain significant amounts of undesirable dissolved minerals. Wash waste water will also typically include significant amounts of organic materials, including oils and other hydrocarbons and bacteria. Further, detergents and other chemicals used in the wash operation present further difficulties to cleaning and reclaiming the water.

A number of water recapturing and reclaiming systems have been proposed. Such systems utilize conventional techniques to remove certain contaminants from the water. Conventionally proposed systems suffer from at least one of the drawbacks that (a) the systems are complex, requiring either highly sophisticated controls or requiring highly skilled operators; or (b) the systems remove certain impurities or contaminants at the expense of leaving others.

For example, it is well-known that suspended solids can be removed from water by allowing the solids to settle out in a still pool. In some systems, this is performed through use of a flocculating tank. Such systems allow the solids to settle out in a still pool. A still pool, however, is an optimal breeding ground for bacteria, which typically give off a strong and unpleasant odor. Additionally, such systems typically require a substantial volume of space.

Alternatively, solids can be removed with cartridge or bag filtration. Each of these systems is advantageous, depending upon the volume of solids in the influent. Cartridge or bag filters will have to be replaced often if a large number of solids of the filtered size are present in the water. Accordingly, cartridge or bag filters are typically not appropriate where large volumes of solids will be recovered. Additionally, where hydrocarbons are present in the water, as is typically the case in vehicle washing operations, cartridge or bag filters can easily become plugged.

Although numerous systems have been disclosed or suggested in the prior art for partial treatment of water, the systems suffer significant limitations. First, no prior art system of which the applicant is aware functions to remove all four specific contaminants which are found in waste wash water: (1) suspended solids; (2) organic contaminants; (3) bacteria; and (4) dissolved minerals. Further, none of the prior art systems of which applicant is aware operates as a complete recycling system, without water discharge.

Additionally, a significant deficiency the prior art relates to inaccuracies in describing systems which purportedly "purify" water or which are represented to yield the result of "pure" water. In reality, unless a system operates to remove all four contaminants (suspended solids, organic contaminants, bacteria and minerals) from water, the water cannot be said to be "purified." Also, the degree of removal of suspended solids is of particular interest. In vehicle washing operations, the majority of suspended solids are between 1 and 10 microns. Accordingly, a system which does not act to remove particles of the size present is not acting to "purify" the water. Yet, there is an increasing need for a system which can yield "pure" waters; and which can do so for relatively small volume applications, for example 500 to 4,000 gallons per day.

Accordingly, the present invention provides a new method and apparatus for purifying water by removing suspended solids, organic materials, bacteria and minerals from the water. Additionally, the present invention provides a system for purifying such water which is particularly suitable in water reclaiming and recycling operations, such as for vehicle washing facilities; and which is further practical in size, complexity and expense for operations treating under 5,000 gallons a day of water.

SUMMARY OF THE INVENTION

The water treatment system in accordance with the present invention utilizes a plurality of mechanisms arranged to remove the contaminants from the water; with each system arranged to remove specific contaminants. In a particularly preferred implementation, several different mechanical systems are utilized to remove the various contaminants.

A first system will be utilized to remove lighter contaminants, including hydrocarbons from the water. Preferably, this will be done through an aeration system which promotes separating of lighter materials from the water by virtue of their different specific densities through use of air percolated through the water. Additionally, a system will be utilized to mix the water with agents to promote settling of the suspended solids. In a particularly preferred implementation a flocculating agent will also be utilized to further facilitate removal of the suspended solids through use of appropriate filters. In a particularly preferred implementation, bag filters are preferred for their reliability and ease of service. An organic removal system will be included to remove organic materials, preferably through use of an appropriately selected contact media. A system will be included to kill bacteria, preferably through use of an appropriately selected contact media. Finally, a deionization or demineralization section will again preferably use a contact media to deionize the fluids flowing through the water treatment system. Thus, aeration chemical treatment, filtration, and contact media deionization may all be used on one preferred implementation to remove the four identified types of impurities.

BRIEF DESCRIPTION OF THE DRAWINGS

FIGS. 8A–8B depict exemplary nozzle assembly suitable for use with the mixing tank of FIG. 7.

FIG. 9 depicts the mixing tank of FIG. 7 from a top, cross-sectional view.

DESCRIPTION OF A PREFERRED EMBODIMENT

Figure 1:
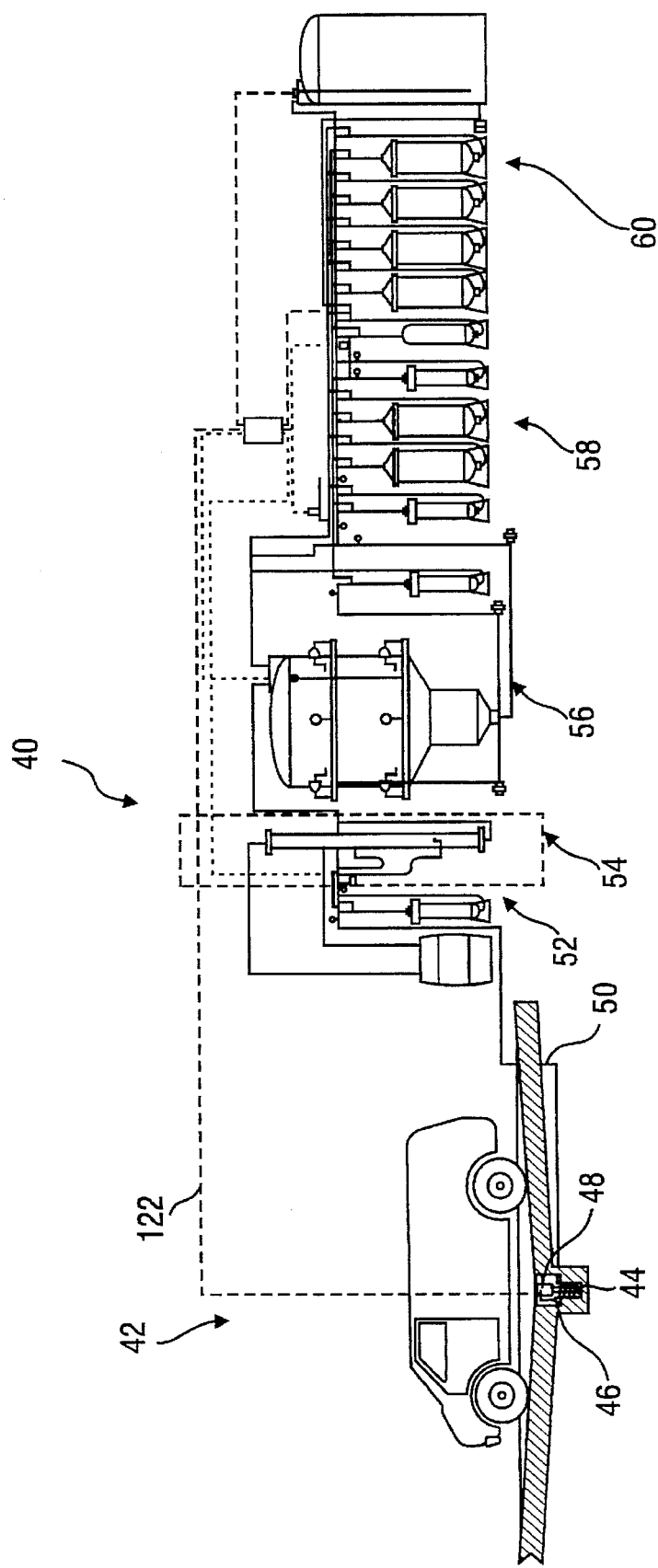
FIG. 1 depicts an exemplary fluid treatment system in accordance with the present invention illustrated in conjunction with an exemplary vehicle washing facility, in one foreseen application of the present invention.
Figure 2:
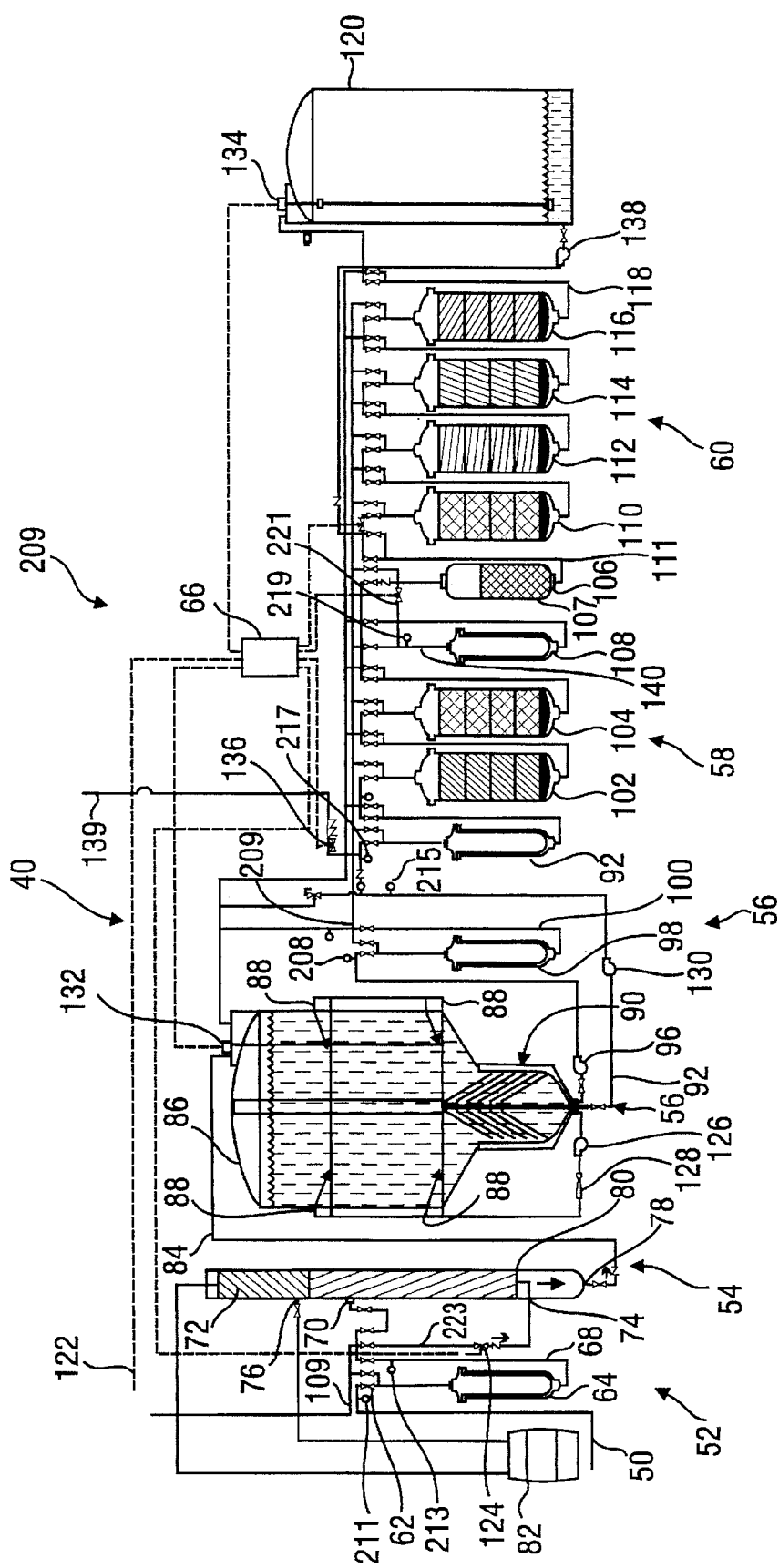
FIG. 2 depicts the water treatment system of FIG. 1 in greater detail.

Referring now to the drawings in more detail, and particularly to FIGS. 1 and 2, therein is depicted an exemplary water treatment system 40 in accordance with the present invention. Water treatment system 40 is depicted in FIG. 1 combination with a vehicle washing facility 42 in a particularly useful and intended application. In FIG. 2, the primary fluid treatment flow path is depicted in bold line.

Vehicle washing system 42 includes a drain 43 into a sump area 44 which collects water running off the vehicle during pre-rinsing, scrubbing, and rinsing. Preferably, a level control 46 in sump 44 will be used to selectively activate a sump pump 48 to selectively transfer discharge water from sump 44 to water treatment system 40 through a conduit 50.

Water treatment system 40 includes five distinct subsystems: a pretreatment filtration system 52 adapted to remove very large suspended solids and contaminants; an aeration separation system 54, adapted to remove volatile and de-emulsified hydrocarbons and other organic contaminants from the water; a chemical flocculation and separation system 56, configured to promote settling of suspended solids, and preferably to flocculate suspended solids and remaining organic contaminants to facilitate this removal; a heavy metal and organic removal contact media section 58 to remove heavy metals as precipitated solids and also to kill bacteria; and a demineralization section 60 using ion exchange to deionize (demineralize) and polish the treated water.

When water is introduced into pretreatment and filtration subsystem 52 through conduit 50, it will be introduced, through a control valve 62 into a filter 64. Filter 64 is preferably a bag filter, and is preferably a bag filter which will include a 100 micron filter bag. A bag filter is optimally easy to service in a system as described; and a 100 micron filter bag will remove the larger suspended solid particles from the water. The use of a smaller filtration member at this stage is undesirable, as it would be highly prone to being clogged by small solids and heavy oils or other hydrocarbons in the influent.

Filter 64, and each bag filter identified herein, will preferably be substantially similar to that disclosed in U.S. Pat. Nos. 4,565,628 and 5,038,830; and will have a modular mesh basket as disclosed in U.S. Pat. No. 4,517,089. The filter bag will preferably be retained in the filter housing 54 a retaining ring as described in U.S. Pat. No. 5,006,243. The disclosures of U.S. Pat. Nos. 4,565,628; 5,006,243; 5,038,830 and 4,517,089, each in the name of Johnny Arnaud, are hereby incorporated herein by reference, for all purposes.

As can be seen in FIGS. 1 and 2, and other figures herein, a number of control valves 62 are provided for selectively controlling the passage of fluid through the respective conduits in which they are placed. Not all of these control valves will be individually discussed herein. Such valves may be assumed to be manually operated valves, except as will be noted herein, primarily in relation to those valves depicted with dash lines extending to a central controller 66 which, as will be discussed herein, will control certain aspects of the system operation. Central controller 66 will preferably be an appropriately programmed microprocessor-based controller adapted in a conventional manner to receive operator and system inputs and to control selected operations of system 40 through control of solenoid operated valves, actuation of pumps, etc. As will be appreciated by those skilled in the art, a simpler electromechanical controller could also be utilized to control operations of system 40.

Fluid traversing bag filter 64 passes out the bottom of the filter 64 and through a conduit 68 to an inlet port 70 of aeration column 72 of aeration section 54. Aeration column 72 is preferably a vertically extending conduit having an air inlet 74 proximate a lower portion of the column, and a hydrocarbon discharge outlet 76 above inlet port 70 in the column. The structural operation of aeration column 72 will be discussed in greater detail later herein. Briefly, however, the filtered influent is introduced into column 72 through inlet port 70 to flow downwardly to an outlet port 78. Preferably, the system may be closed and operated under pressure. Intermediate inlet port 70 and outlet port 78 is an air inlet 74 including a diffuser 80 which introduces air into column 72 to percolate upwardly through the influent column, thereby promoting separation and rising of hydrocarbons and lighter organic matter. The oil may be introduced at an incremental pressure over the maximum fluid head pressure within column 72. For example, a pressure of approximately 2 psi over the incremental pressure of outlet check valve 149 may be appropriate. The separated materials are then retained above the water at the top of the column. When sufficient organic contaminants are collected at the top of the column, they are selectively removed by draining through outlet port 76 into a storage reservoir 82.

The discharge from aeration column 72 is communicated through outlet port 78 and conduit 84 to be introduced into treatment tank 86. Treatment tank 86 is adapted to promote the treating of the water to remove suspended solids, but to not do so through use of a still water environment that would promote bacteria growth. Although other systems might be utilized with the prevent invention, treatment tank 86 is of a unique design expressly suited to those objectives. The structure and operation of treatment tank 86 will be discussed in detail later herein. Briefly, however, the water is stirred through the introduction of an air and water mixture into a plurality of nozzles 88 to facilitate mixture of the water with one or more chemicals acting as flocculating agents. Preferably, the nozzles are placed to establish a turbulent flow in addition to the aeration. A flocculating accelerator may also be introduced into treatment tank 86.

Treatment tank 86 also facilitates the recirculating of contained water under treatment through a filter, to remove the suspended solids. During this recirculation operation, water containing substantial flocculated solids will be withdrawn from a lower portion of treatment tank 86 through a pump 96 and communicated to a bag filter 98 to remove the flocculated solids, with the filtered fluid then being returned through conduit 100 to treatment tank 86. Thus, water will be repeatedly cycled through treatment tank 86 and filter 98 to remove suspended solids.

At the lower portion of treatment tank 86 is a mechanical separation system, indicated generally at 90, to further facilitate removal of flocculated solids from the water. Mechanical separation system 90 uses laminar flow through a multi-plate separator to remove the flocculated solids. The treated water from treatment tank 86 passes out a fluid outlet conduit 92 downstream from mechanical separation system 90, to a multi-stage bag filter 94.

Multi-stage bag filter 94 preferably includes three filter bags concentrically located relative to one another. The filtration capacities of these bags will be selected in response to the solids size and distribution expected in the water. Typically, for a vehicle wash waste water system, 3 bags with filtration capacities of 25, 5 and 1 microns would be anticipated to be satisfactory. The use of these multiple bags will serve to substantially avoid clogging of the one micron bag, and will thereby facilitate longer intervals between bag replacements. Bag filter 98 will have a filtration capacity selected in reference to the solids suspended in the treatment fluid and the degree of flocculation expected. It is anticipated that bag filter 98 will be a 3 stage filter with bag filtration capacities of 25, 5 and 1 microns, as described relative to bag filter 94.

From bag filter 94, the treatment water is communicated to treatment vessels 102 and 104, connected in series. Treatment vessels 102 and 104 each preferably include a polishing granular medium, such as activated carbon, to ensure the removal of even trace amounts of organic contaminants from the water. In addition, the use of activated carbon as a contact medium acts as an initial stage for removal of chlorine from the treatment water to protect ion exchange resins in subsequent treatment vessels. It is important that all organic matter be removed at this stage; because without the presence of chlorine, it will not be practical to eliminate bacteria from the treatment water in subsequent stages. In one preferred embodiment, the granular contact medium in treatment vessel 102 will be a high load capacity granular contact media of carbon and silica compounds. For example, an exemplary suitable carbon and silica-based media is that marketed as Clarion PM-100, by CETCO of Arlington Heights, Ill. Alternatively, a high capacity polymer contact media may be used in vessel 102. The contact media is selected to remove remaining hydrocarbons and other organic contaminants.

The contact media in treatment vessel 104 will preferably be granular activated carbon. This stage will remove remaining traces of hydrocarbons and organics. The contact media in each vessel will preferably be contained within porous modules as discussed relative to FIG. 13.

After vessel 104, fluid is introduced to media treatment vessel 106 for contact with another media 107, such as a blend of granular high purity copper and zinc, selected to remove heavy metals and chlorine and to kill any bacteria in the system. An exemplary contact media is that marketed as KDF® 55 Medium by Fluid Treatment, Inc. of Constantine, Mich. As an alternative, an iodine resin contact media may be used in vessel 106.

Figure 15:
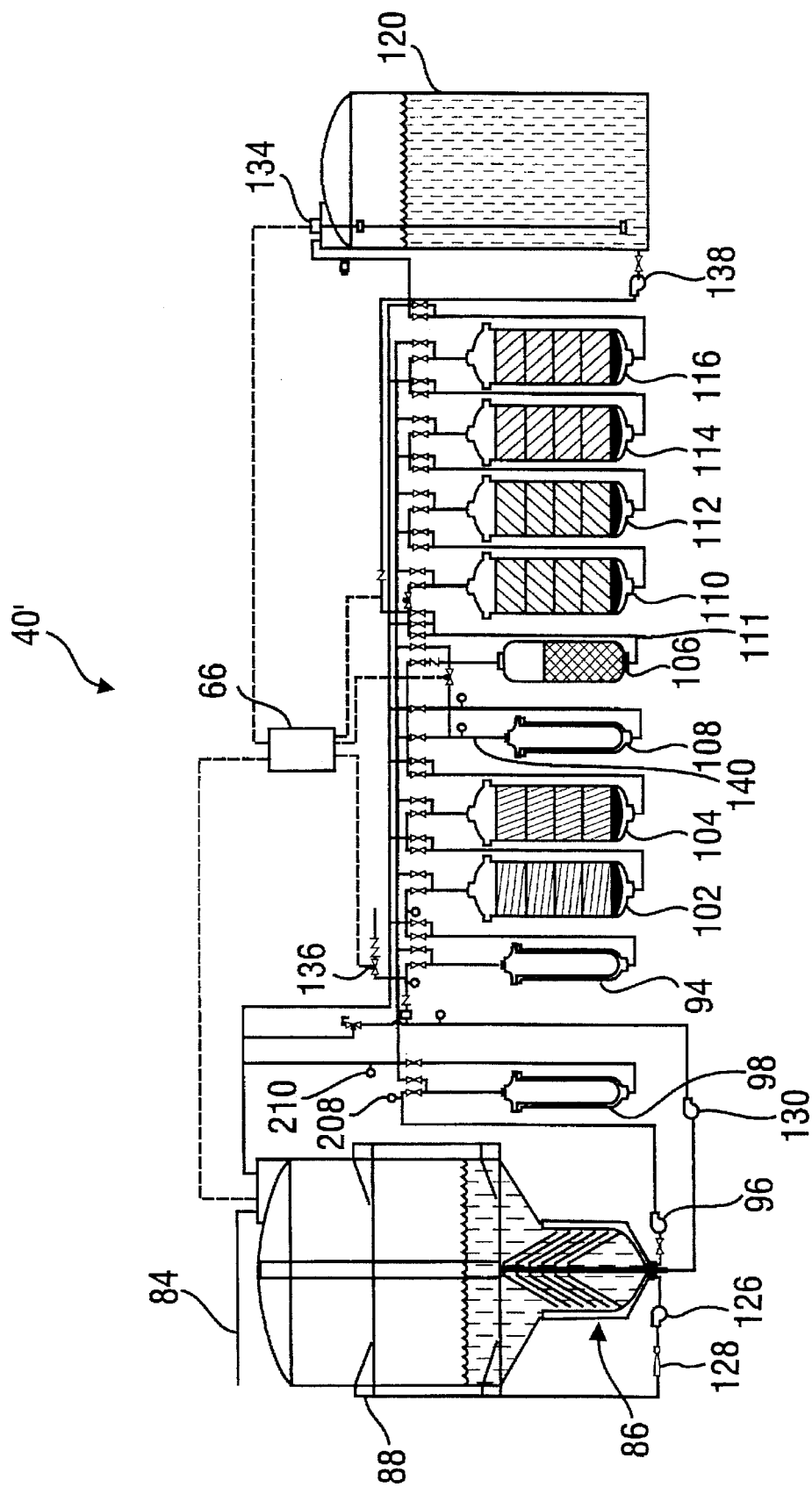
FIG. 15 depicts a portion of the system of FIG. 2 during the backwashing of a selected contact media vessel.

Heavy metals have not been observed to be a problem in most vehicle washing systems. However, when removing heavy metals from a water, the media in treatment vessel 106 will retain precipitated metals as particulates in the media bed. These particulates will preferably be removed from the media by backwashing of contact media 107, thereby fluidizing the media and facilitating removal of retained solids. Another bag filter 108 is included and coupled through appropriate conduits and valves to facilitate removal of suspended solid particles removed from the media 107 in vessel 106 during backwashing operations. This backwashing operation will be under the control of controller 66 to utilize fully treated water from tank 120 withdrawn by pump 138 to backwash through vessel outlet conduit 111, with the backwash fluid passing into treatment tank 86. FIG. 15 substantially depicts in bold line the fluid flow path established by controller 66 during such a backwashing operation. Bag filter 108 preferably again contains three concentric bags of decreasing micron rating, as described relative to bag filter 94.

Treatment water is then communicated to deionization/demineralization stage 60 including a first treatment vessel 110 including an anionic exchange resin, which serves as an organic trap; vessel 112 which contains a cationic exchange resin, and serves as the first stage of demineralization; and vessels 114 and 116 which each again preferably include anionic exchange resins to form the second stage of demineralization. Anionic exchange resins typically have relatively lower capacity than do cationic exchange resins, accordingly, two vessels 114, 116 are provided for treatment of the treatment fluid. From anionic treatment vessel 116, the water is communicated through a conduit 118 to storage tank 120 where the fluid is ready for reuse.

Organic trap treatment vessel 110 serves as an organic trap which protects later contact medias in deionization stage 60. Organic trap treatment vessel 110 preferably includes an anionic exchange resin regenerated with chlorides. When organic matter flows through such resin, the ionized organic matter is adsorbed onto the resin beads and chloride ions are released into the water in exchange for the organic matter. The chloride ions, which are anions, flow through the cationic ion exchange resin bed in vessel 112 unaffected, and into the anionic ion exchange resin beds in vessels 114 and 116 where they are exchanged for hydroxide. This action increases the hydroxide released from the anion ion exchange resin over what is released from exchange of dissolved mineral anions. The excess hydroxide radicals serve as a powerful oxidant which destroys organic matter by oxidation. While not wishing to be bound by theory, it is believed that the use of treated water having excess hydroxide radicals in a recirculating system will promote the early breakdown of organic matter entering the water during subsequent use cycles of the water.

An exemplary anionic exchange resin suitable for use as a media in organic trap treatment vessel 110 is that marketed under the name Tulsion® A-72MP by Thermax Private, Ltd. of Novi, Mich.

An exemplary cationic exchange resin suitable for use as a contact media in treatment vessel 112 is that marketed under the name Tulsion® T-42 by Thermax Private, Ltd. of Novi, Mich.

Unlike the anionic exchange resin in treatment vessel 110 used as the organic trap, the anionic exchange media utilized in treatment vessels 114 and 116 will be regenerated with sodium hydroxide, thereby providing the hydroxide radicals which may subsequently be released into the treated water, as described above. An exemplary suitable media is Tulsion® A-36MP, also marketed by Thermax Private, Ltd. of Novi, Mich.

Again referring to FIGS. 1 and 2, the control of water treatment system 40 will be described. When level sensor 46 in sump area 44 indicates that a predetermined level is reached, and sump pump 48 is turned on to move fluid through treatment system 40, a signal will be communicated across line 122 to controller 66. Controller 66 then opens solenoid controlled valve 124 allowing pressurized air from an appropriate source, through conduit 223, to enter air inlet 74 and pass through diffuser 80 to percolate up through aeration column 72. Treatment water will be allowed to pass through aeration column 72 and into water treatment tank 86, where the fluid will be allowed to accumulate to a predetermined level. When a sufficient volume of water has accumulated in treatment tank 86, a mixing pump 126 under the control of controller 66, will be actuated, pressurizing fluid drawn from a lower portion of treatment tank 86 and passing it through a venturi 128, causing air to be drawn into the fluid, and causing the air and water to be injected into the tank through a plurality of nozzles 88. Nozzles 88 are angularly oriented in treatment tank 86 so as to induce a swirling motion into the water in tank 86. The air drawn into the system rises through the swirling water and assists in the mixing of the treatment water with a flocculating agent introduced into the mixing tank 86. Subsequently, a flocculating aiding or accelerating agent will preferably be introduced into mixing tank 86 and mixed by the same action. Upper and lower level sensors may be utilized to assure that treatment tank 86 is only operated (through pumps 126 and 96) when a desired fluid level is present, and to assure that pump 130 does not completely drain pump 190, and is therefore always primed.

Preferably, the flocculating agent will include one or more of the following: lime, aluminum sulfate, and/or bentonite or other materials selected to promote flocculation and settling of the suspended solids. Pump 126 will be actuated for an appropriate time. For example, 10–15 minutes to assure adequate mixing of the flocculating agent in the treatment water. Additionally, a selected polymer will typically subsequently be added to the tank to aid flocculation of the solids. For example, the polymer contained within the product EMF-1 Splitting Agent marketed by Specialty Equipment Co. of Mendata Heights, Minn., is a suitable polymer for this purpose. After another 10–15 minute mixing period, mixing pump 126 will be turned off by controller 66 and recirculating pump 96 will be actuated. Recirculating pump 96 causes a downward flow of the contents in treatment tank 86, initiating a settling reaction. The contents of the tank flow through bag filter 98 in which flocculated solids are removed from the water, and the water is then passed back to treatment tank 86 through conduit 100. Draw-down pump 130 will be actuated at the appropriate time to remove fluid from treatment tank 86 through mechanical separation system 90 and to pass it, in the above described manner, to bag filter 94, and the serially connected treatment vessels 102, 104, 106, 110, 112, 114 and 116. When all water has been withdrawn from treatment tank 86, a level control 132 provides a low water signal to controller 66, and draw-down pump 130 will be deactivated. Controller 66 is also responsive to a level signal from a level control 134 in clean water tank 120.

If the water level in clean water tank 120 is below a predetermined threshold limit, controller 66 may actuate a solenoid controlled valve 136 to allow city makeup water to enter the system (at 139) and to be treated, as previously described, through bag filter 94 and the serially connected components until the predetermined level is reached. It should be noted that although the current system does not initiate water discharge, that some water will be lost during the washing of that operation due to evaporation. Accordingly, system 40 operates to assure that an adequate supply of fully treated water is available. When a batch treatment operation is complete, controller 66 will actuate backwash pump 138 which will initiate a pressure of a backwashing the contact media in treatment vessel 106. As previously discussed, precipitated metal solids collected in the contact media of vessel 106 will be removed by the backwashing action, and communicated through conduit 140 to bag filter 108, where the solids will be retained in the multiple filter bags. The backwashing water will then be passed through conduits 142 and 146 to treatment tank 86. In one preferred implementation, the backwashing operation will continue for approximately 10 minutes, at a rate of approximately 20 gallons per minute. During this period, 200 gallons of water will be taken from the clean water storage tank 120 and returned to the water treatment tank 86.

Figure 3:
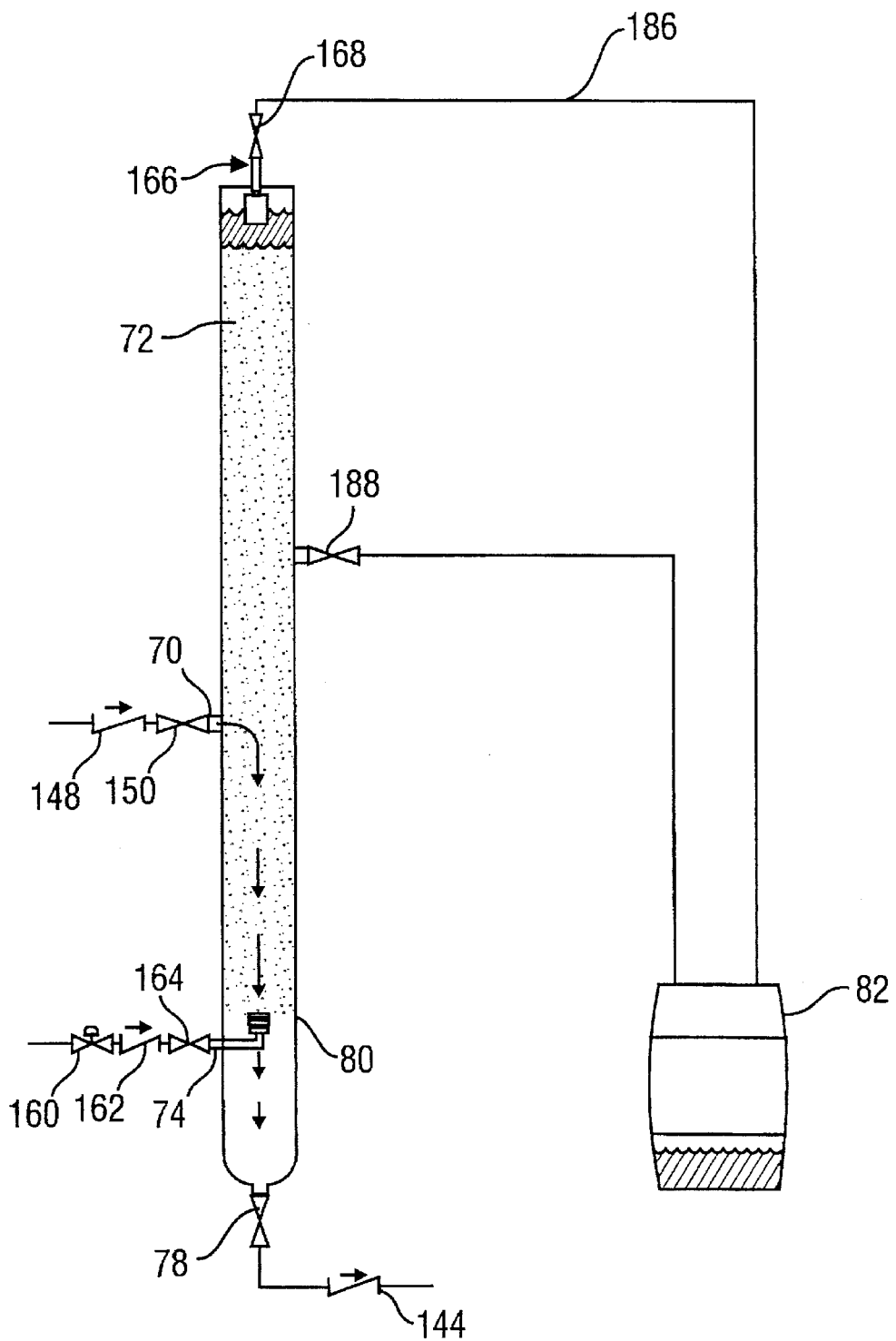
FIG. 3 depicts the aeration column of the water treatment system of FIGS. 1 and 2 in greater detail.

Referring now to FIG. 3, therein is depicted aeration subsystem 74 in greater detail. As previously described, treatment water enters column 72 through an inlet port 70. Preferably, a check valve 148 and a cutoff valve 150 will be located at inlet 70. Cutoff valve 150 will allow control of fluids into column 72. Check valve 148 assures that fluids remain within aeration column during the treatment process. A second check valve 149 will be located beneath cutoff valve 78. Check valve 148 will be selected with a cracking, or opening, pressure equal to the pressure to be maintained in the column above the valve. The cracking pressure of check valve 149 is selected to exceed the head pressure in column 72 and to prevent draining of column 72 when sump pump 48 is turned off. Also, within this particular exemplary embodiment which is adapted to process water at a rate of approximately 10 gallons per minute, aeration column 72 is expected to have a height of about 10 feet and an internal diameter of about 8–10 inches. In this exemplary embodiment, fluid inlet 70 will be placed approximately 48 inches above air inlet 79. Air will be injected through a solenoid operated valve 160, a check valve 162 and a cutoff valve 164. The air is introduced through diffuser 80 which causes the air to separate into bubbles so as to optimally aerate fluid within column 72.

Figure 4:
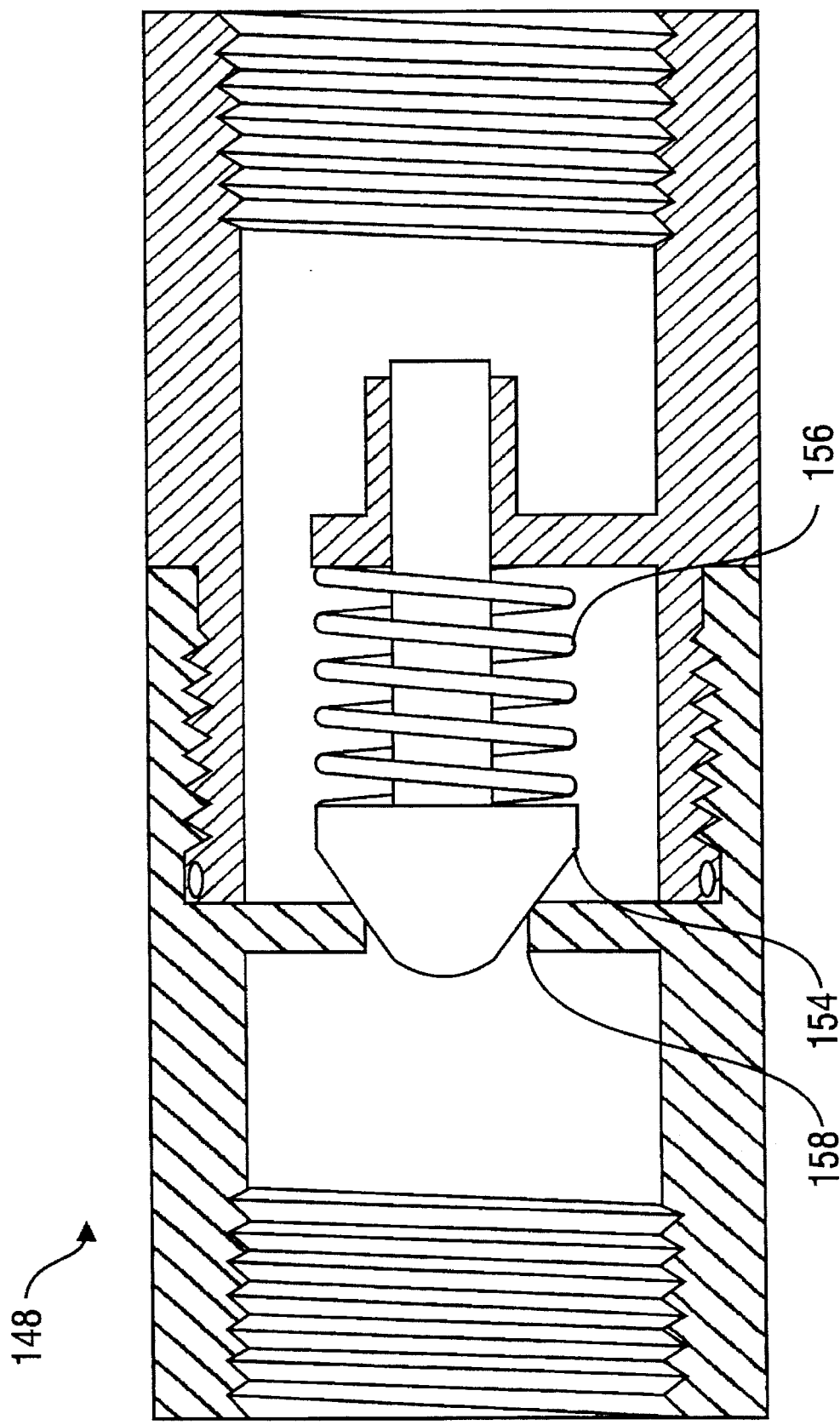
FIG. 4 depicts an exemplary embodiment of a check valve suitable for use with the aeration column of FIG. 3, illustrated partially in vertical section.

An exemplary configuration for check valve 148 (and for check valve 149) is depicted in FIG. 4. Check valve 148 includes a valve member 154 having a generally conical valve piston which is biased by a spring 156 against a valve closing seat 158.

Figure 5:
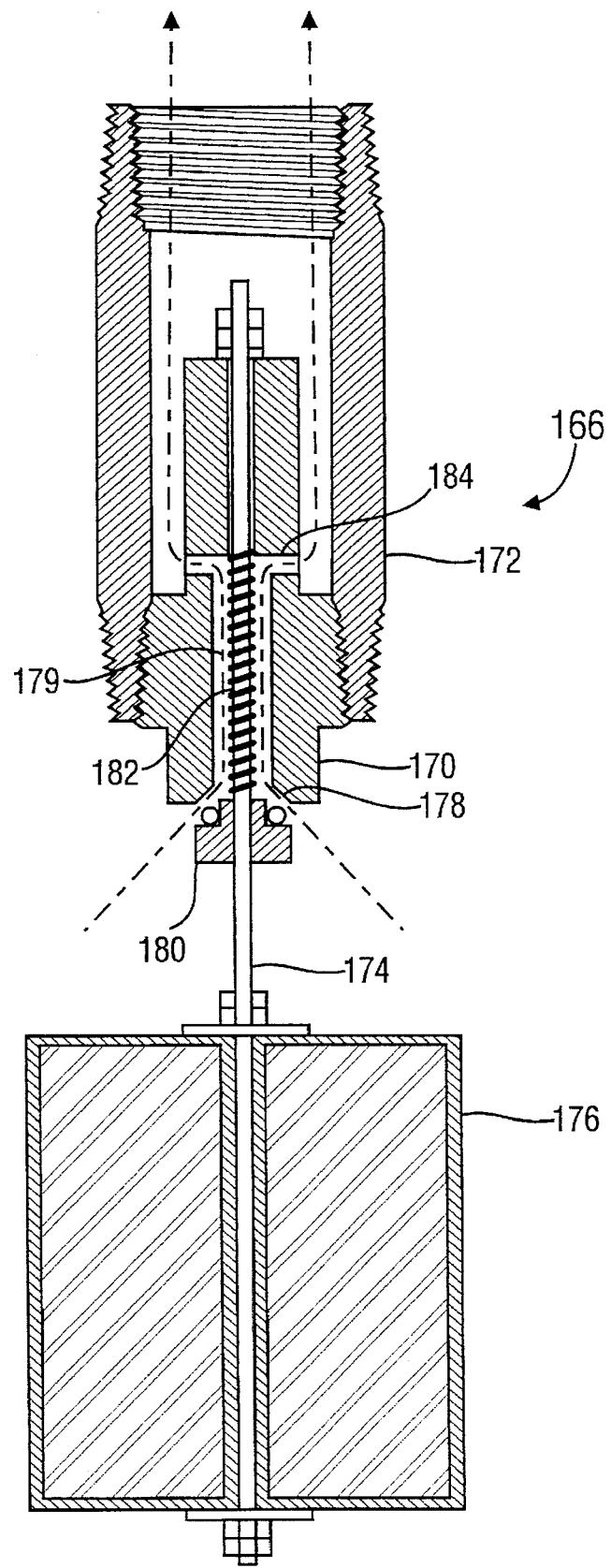
FIG. 5 depicts an exemplary embodiment of a float valve suitable for use with aeration column of FIG. 3, illustrated partially in vertical section.

Proximate the top of column 72 is a float-control valve 166 and a cutoff valve 168. Float control valve 166 operates to maintain a desired pressure head in column 72. FIG. 5 depicts one exemplary construction for float control valve 166. Float control valve 166 includes a valve body 170 coupled within a valve housing 172. A valve stem 174 is coupled to a float 176 and is longitudinally moveable within valve body 170. Valve body 170 includes a valve seat 178, and valve stem 174 carries a valve plunger 180. A spring 182 normally biases valve stem 174 and valve plunger 180 downwardly, as depicted in FIG. 5, thereby providing a flow path across valve seat 178 through passages 179 in valve body 170 and out through ports 184 in valve body 170. If a rising level of fluids causes float 176 to move upwardly, valve plunger 180 will seat against valve seat 178, cutting off the flow path and retaining fluid and pressure within column 72. Thus, aeration may be performed with a pressurized fluid column. Air discharged through flow control valve 166 is communicated through conduit 186 to storage reservoir 82 so as to be certain to recapture any detergent bubbles which might be carried out of the column by the air.

As will be appreciated, as gases accumulate at the top of column 72, the liquid will be displaced downwardly and float 176 in float valve 166 will be allowed to fall, opening float control valve 166. Thus, float valve 166 serves to allow gasses to be discharged, but the hydrocarbons to be allowed to continue to accumulate at the top of the fluid column in column 72.

Figure 6:
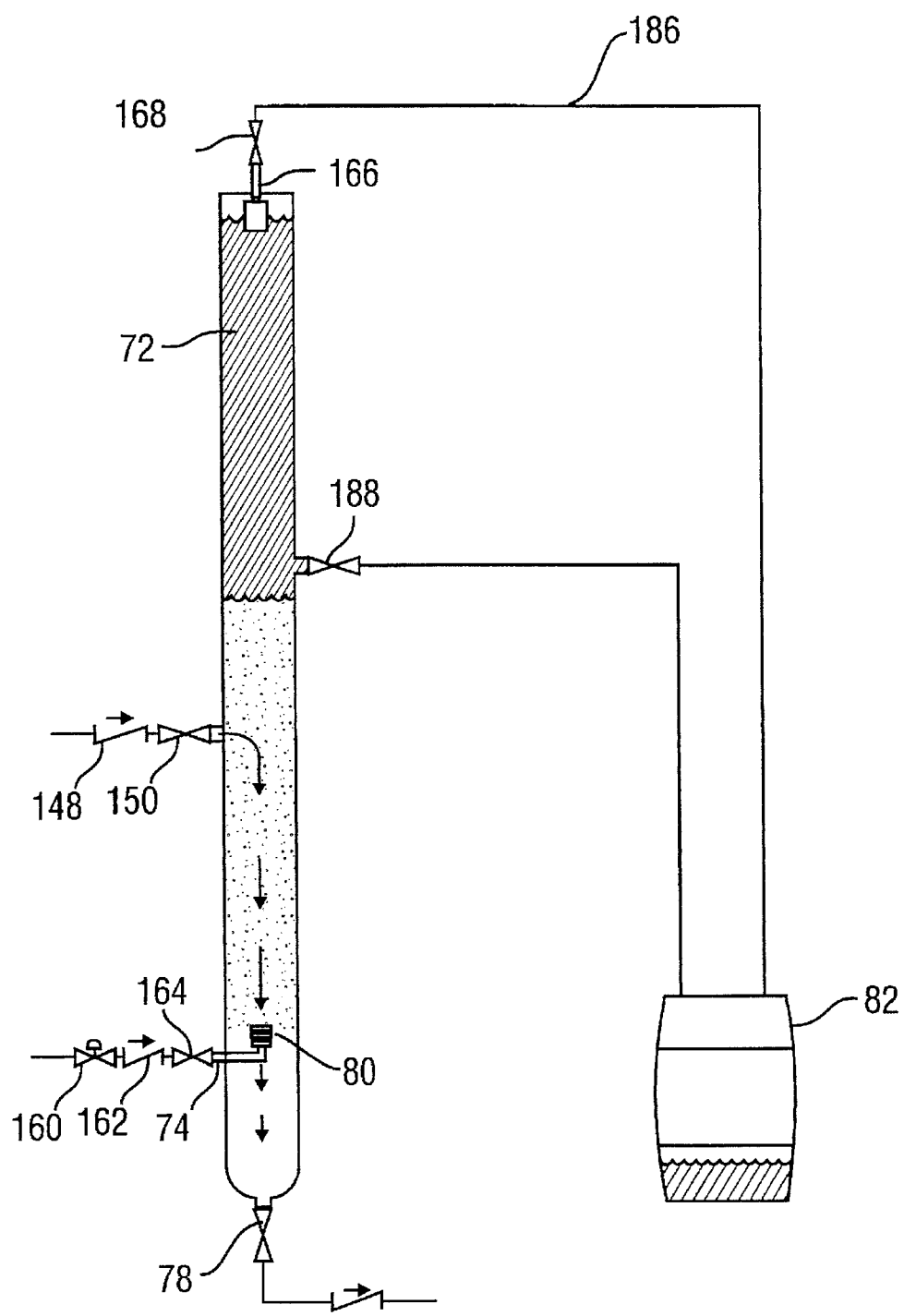
FIG. 6 depicts the aeration column of FIG. 3 during an exemplary stage of operation.

Referring now also to FIG. 6, when sufficient hydrocarbon contaminants accumulate at the top of column 72, the system will be shut down to facilitate draining of the contaminants to storage reservoir 82. The shutdown and draining may be performed by a variety of recognized means, ranging from visual inspection and manual operation of drain valve 188, to various types of electrical potential sensing devices (not illustrated) which may be included within column 72, or within a parallel column, to detect the presence of the oil/water interface and to function with controller 66 to automatically control drain valve 188. When contaminants are to be drained from column 72, influent through port 70 will be cut off through check valve 148, and outlet valve 78 will be closed. Preferably, air will continue to be introduced through air inlet 74 and diffuser 80 so as to establish an air pressure head which will assist in draining contaminants through drain valve 188 to storage reservoir 82. Once the draining operation has been completed, the valves can be returned to their usual and operating states, and operation of column 72 can resume.

Figure 7:
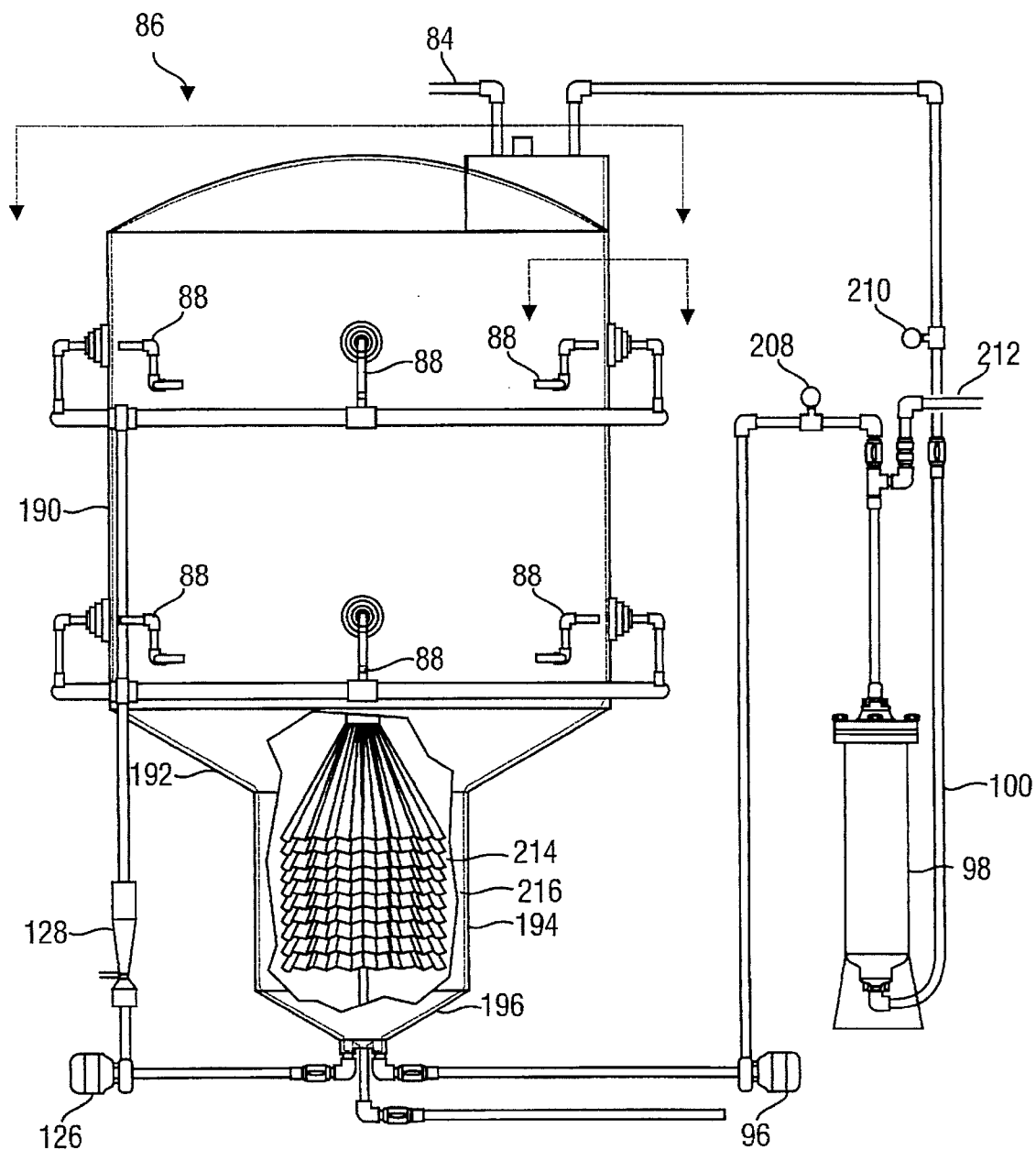
FIG. 7 depicts, partially in cut-away view, the water treatment tank of the water treatment system of FIGS. 1 and 2.

Referring now to FIGS. 7–9, therein are depicted treatment tank 86, and portions thereof. Water from aeration column 72 will be introduced through conduit 84 to an upper portion of treatment tank 86. Treatment tank 86, in essence, combines several treatment operations in one vessel. Tank 86 includes a relatively large main tank 190 having a generally conical lower portion 192 which extends into a smaller, sump portion 194. Sump portion 194 also includes a generally conical bottom section 196. Upper portion 190 of tank 86 includes a mixing system which includes mixing pump 126, venturi 128 and circumferential conduits to four or more inwardly and generally circumferentially extending nozzle assemblies 88. Preferably, at least eight nozzles 88 will be distributed both vertically and circumferentially around upper portion 190 of tank 86. Each nozzle is configured as depicted in FIG. 9, to direct the air/water mixture in a generally circumferential direction around tank portion 193. Referring to FIGS. 8A–B, it can be seen that tank portion 190 is penetrated by a tank fitting 198 including a seal assembly 200 to prevent water from leaking around injector pipe 202 of nozzle assembly 88. Preferably, a swing joint 204 will allow adjustment of the orientation of each nozzle outlet 206, as desired.

The capacity of treatment tank is variable, but may be selected, for example, to hold the anticipated water volume from one day's washing operations in the washing bays to which system 40 is arranged to service. For example, in one preferred embodiment expected to service the washing of approximately 100 vehicles, treatment tank 86 will have a volume of approximately 1200 gallons, of which sump portion 94 will have a capacity of approximately 100 gallons.

As previously discussed relative to FIGS. 1 and 2, a recirculating and filtration system is associated with treatment tank 86, consisting of recirculation pump 96, coupled to sump 194, bag filter 98 and a return conduit 100 from bag filter 98 to treatment tank 86. As with other portions of the system, pressure gauges 208 and 210 may be included on the upstream and downstream sides of bag filter 98 to indicate recirculating system pressures on each side of bag filter 98. This will assist in determining when the elements of bag filter 98 require servicing. For example, in a filter as described earlier herein, a differential pressure of 20 psi indicated between gauges 208 and 210, would suggest that one or more elements in bag filter 98 require replacement. When replacement of bags in bag filter 98 is required, a supply of compressed air (through line 209) may be introduced through conduit 212 to drain filter 98. Similar pairs of pressure gauges 211 and 213, 215 and 217, and 219 and 221, respectively, and air supply line 209 are coupled to bag filters 64, 94 and 108 to facilitate monitoring and servicing of the filters (see FIG. 2).

Figure 10:
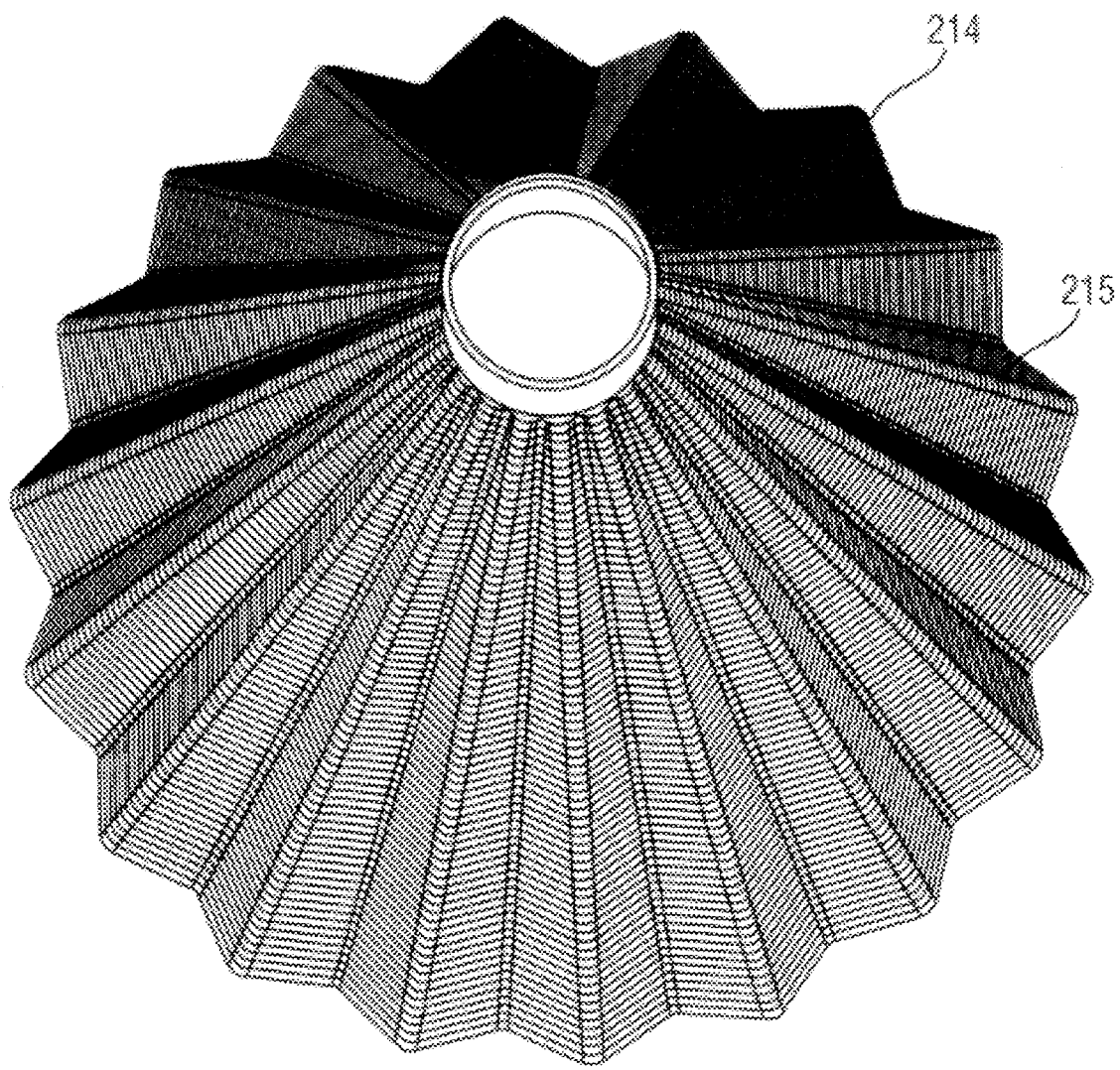
FIG. 10 depicts a chemical separator member suitable for use with the mixing tank of FIG. 7.
Figure 11:
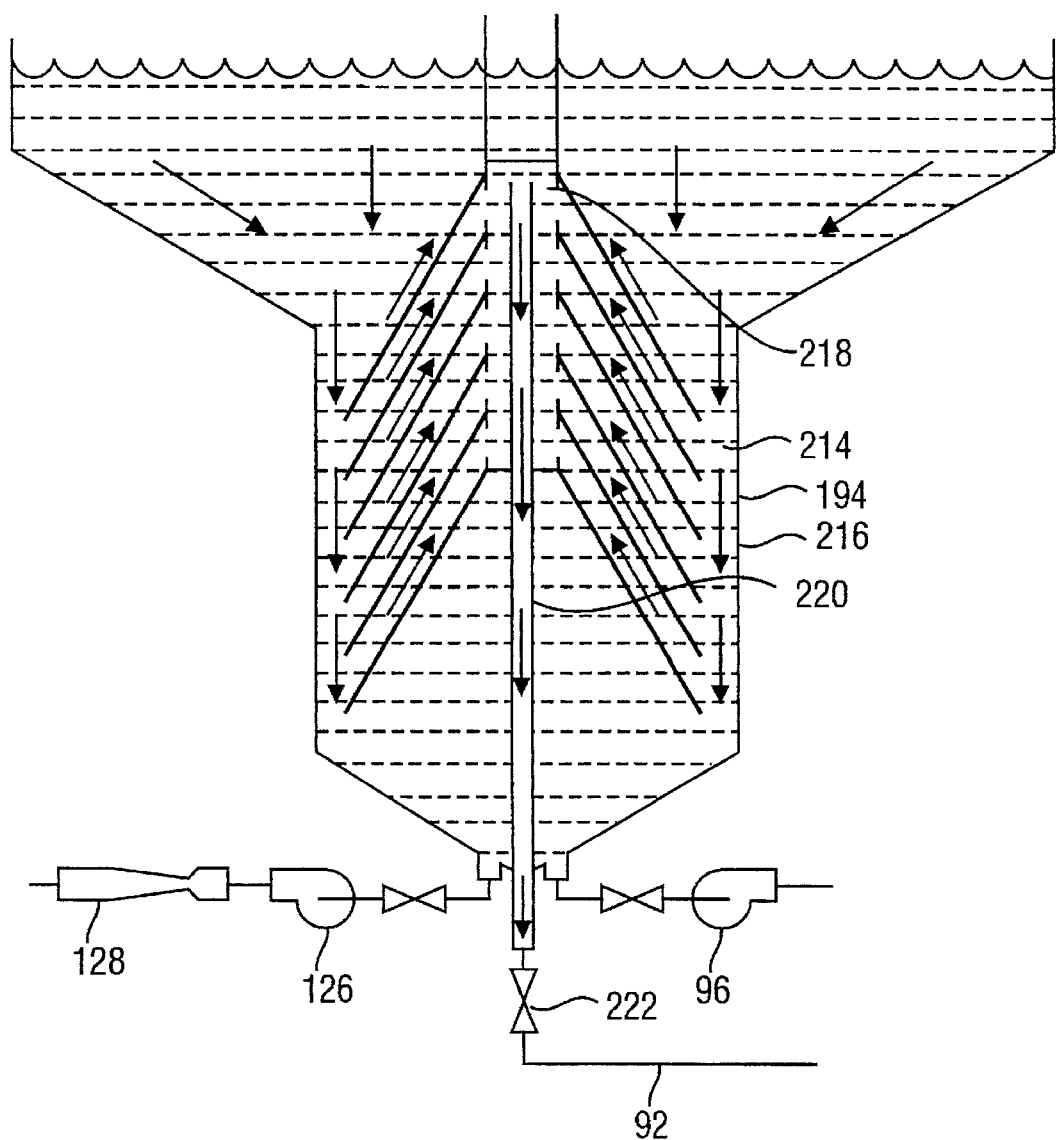
FIG. 11 schematically depicts a portion of the structure of the mixing tank of FIG. 7, illustrating the flow of fluids therethrough during operation.

As can be seen in FIG. 11, water from large tank portion 190 will flow downwardly to sump 194, and laminar flow will be established between a plurality of parallel-placed corrugated cones 214 (FIG. 10) to further promote additional settling of any solid particles in the water. Preferably, cones will have an angle of approximately 60 degrees and will include a number of generally radially extending corrugations 215. Cones 214 will preferably be formed of a molded material, such as molded polyethylene. As water flows upwardly through corrugated cones 214, particles will accumulate and will move down the slope of the cone to be carried away by downwardly moving fluid in the annular area 216 in sump 194 surrounding cones 214. The water, minus the flocculated solids, may then enter an entrance 218 of exit 220 to pass through cutoff valve 222 and conduit 92, to pass to bag filter 94.

Figure 12:
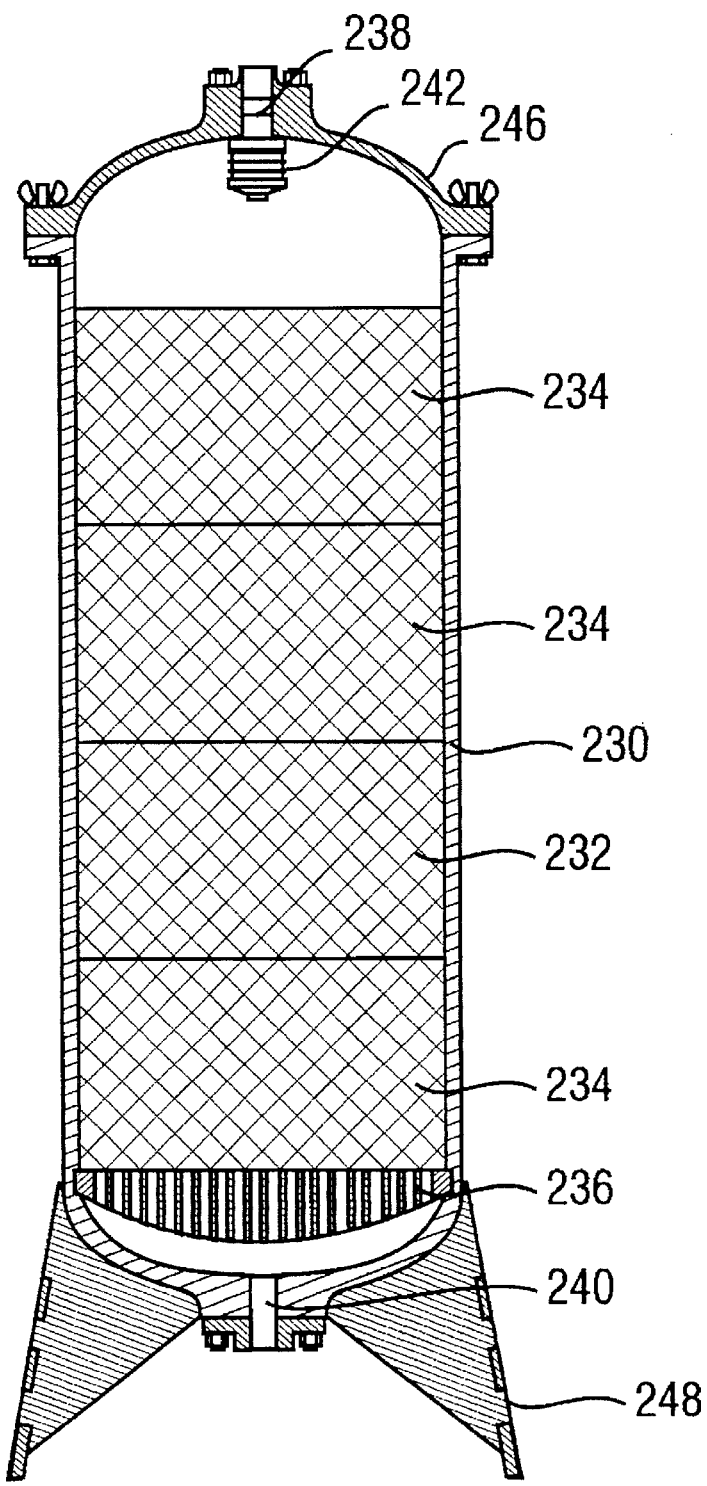
FIG. 12 depicts an exemplary form of contact media vessel suitable for use with the present invention, illustrated partially in vertical section.
Figure 13:
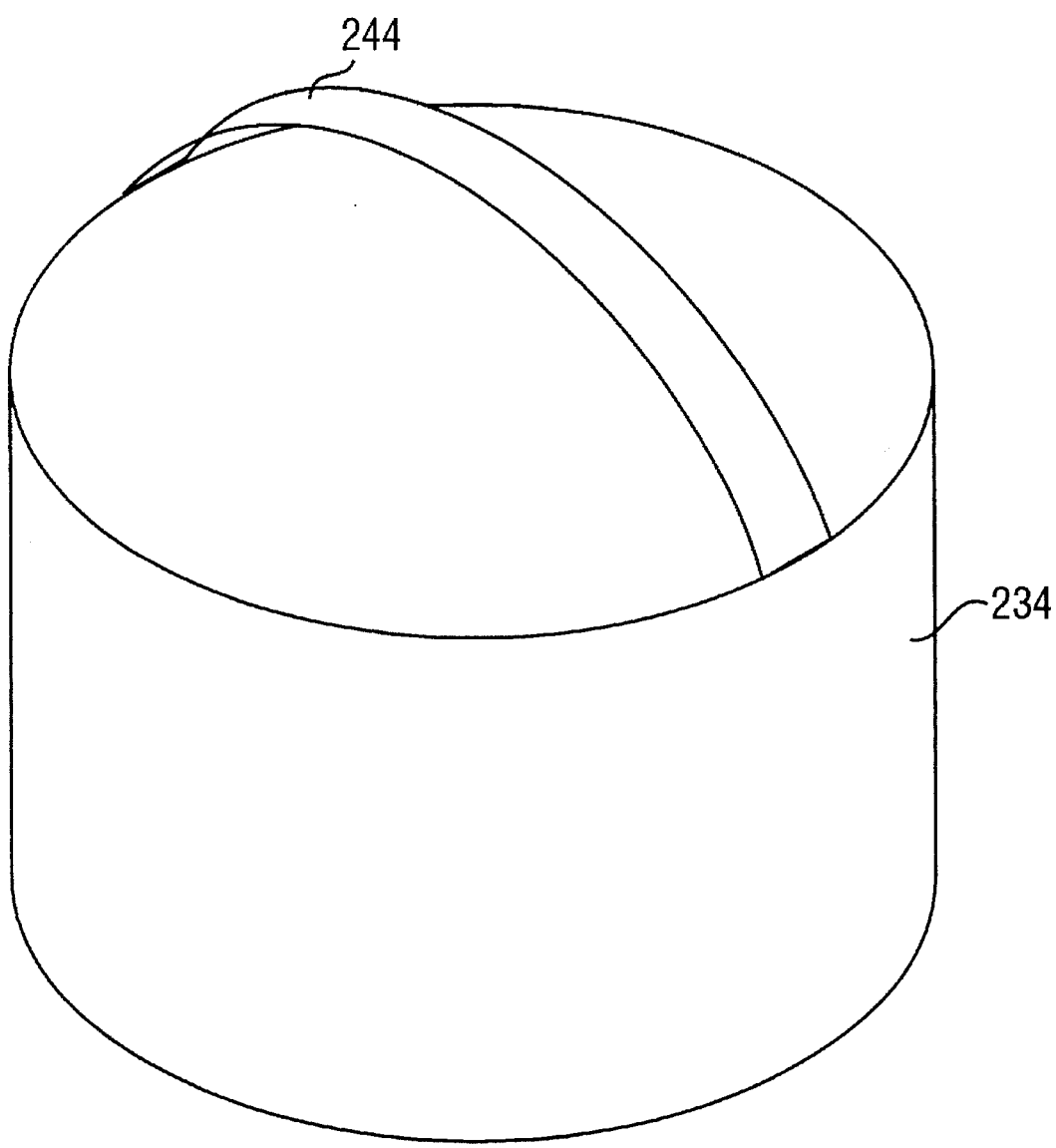
FIG. 13 depicts an exemplary contact media containment module of the type envisioned for use with the present invention.

Referring now to FIGS. 12 and 13, therein is depicted an exemplary contact media vessel 230 of the type envisioned for use with the present invention; and in FIG. 13, a modular contact media bag suitable for use with vessel 230. Contact media vessel 230 includes an outer housing 232 which contains a plurality of individual modular bags 234 of a particular contact media. Outer housing 232 will be nonreactive, and will preferably be injection molded. Contained proximate the lower portion of housing 232 is a diffuser plate 236 which is highly porous, such as through a plurality of apertures, so as to allow drainage of fluid passing from inlet 238 through contact media modules 234 to outlet 240. Preferably, a distributor or diffuser 242 will be located proximate fluid inlet 238 to assure generally uniform distribution of the treatment water across the column. Each contact media module will preferably be generally cylindrical and formed of a highly porous cloth suitable for retaining the particular contact media. A handle 244 may preferably be provided so as to optimally facilitate removal of each module from the top of housing 232 when lid 246 is removed therefrom. In one preferred embodiment, each contact media module 234 will contain approximately 1 cubic foot of contact media. In the most preferred embodiment, housing 232 will be approximately 4.75 feet tall, and will have a diameter of approximately 15.5 inches. A base 248 is provided to retain column 232 in an upright position.

Figure 14:
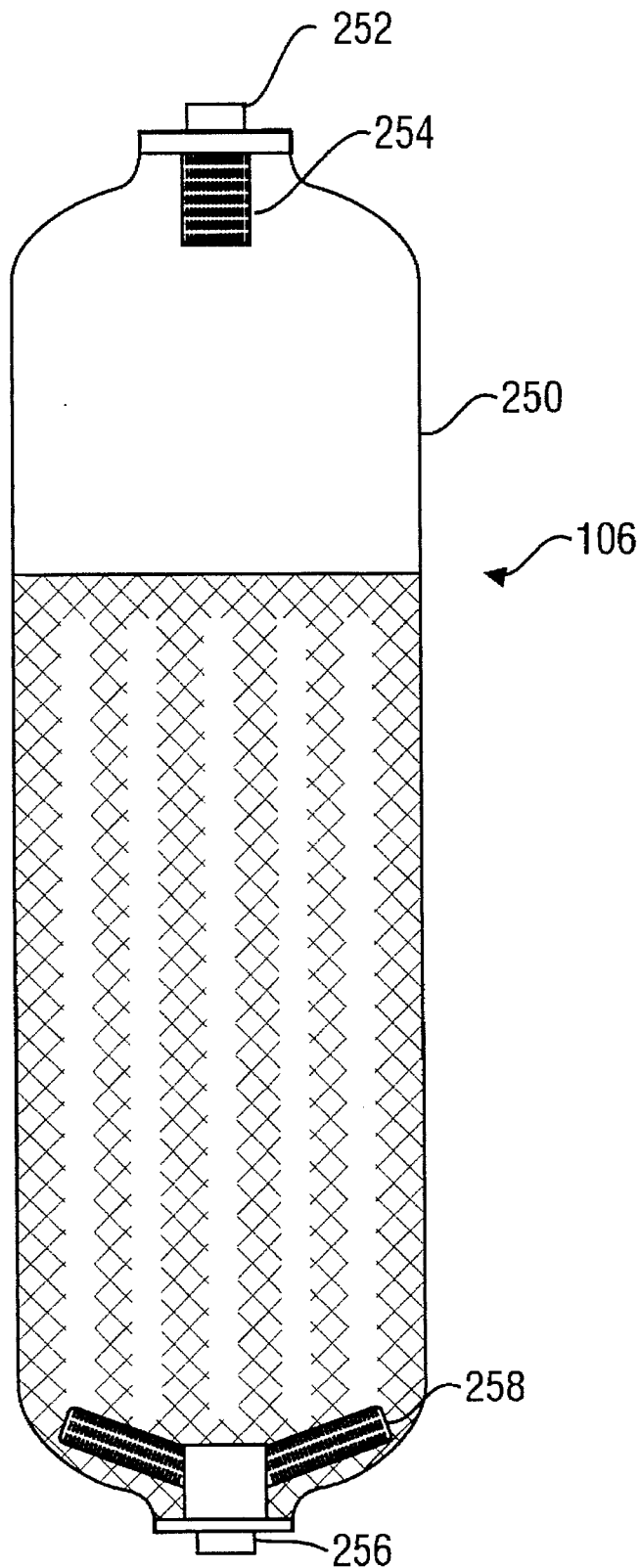
FIG. 14 depicts an exemplary backwashable contact media vessel suitable for use with the present invention, illustrated substantially in schematic representation.

Referring now to FIG. 14, therein is depicted, in schematic form, an exemplary vessel suitable for use as vessel 106 for housing the contact media used for controlling bacteria in the water treating system, which vessel will be periodically backwashed. Vessel 106 includes a tank member 250 having a fluid inlet 252 and a distributor or diffuser 254 associated therewith. Proximate a lower end is a fluid outlet 256 which is isolated from the interior of tank 250 by a lower diffuser 258. Upper diffuser 254 and lower diffuser 258 are both sized to preclude the passage of the contact media therethrough. Accordingly during forward flow (fluid introduced through fluid inlet 252), or through backwashing (fluid introduced through fluid outlet 256), the contact media is retained within vessel 250.

Figure 16:
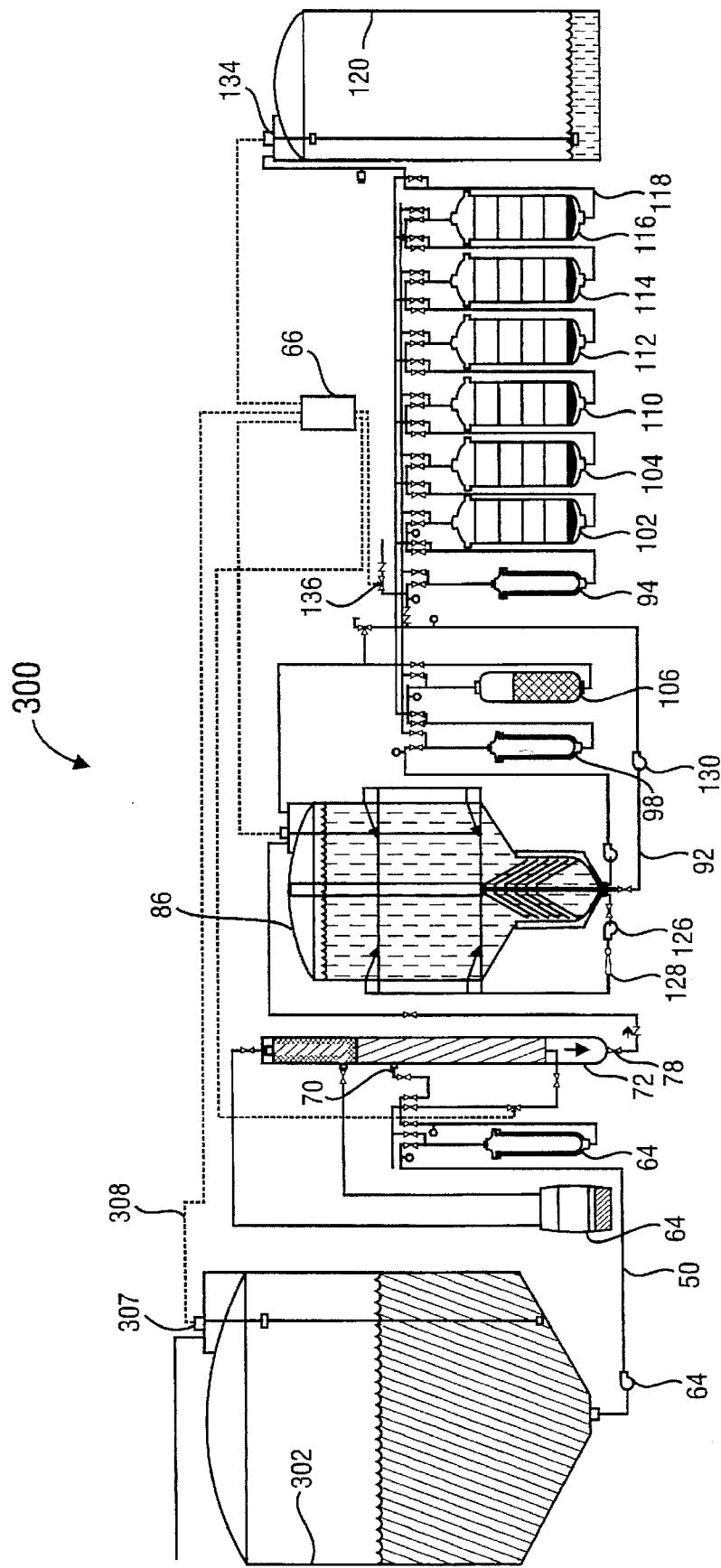
FIG. 16 schematically depicts an alternative embodiment of an exemplary fluid treatment system in accordance with the present invention.

Referring now to FIG. 16, therein is depicted an alternative embodiment of a water treatment system 300, also in accordance with the present invention. Water treatment system 300 has many components in common with system 40, and similar devices and structures therein have been numbered identically. Water treatment system 300 includes a reservoir 302 to collect water to be treated. As with embodiment 40, the water is communicated to a bag filter 64 and an aeration column 72, and from aeration column 72 to water treatment tank 86. From water treatment tank 86, after leaving treatment tank 86, pump 130 transfers the treatment fluid to bag filter 94, and from there to treatment vessels 102 and 104 containing activating carbon. It will be seen in FIG. 15 that recirculating pump 96 will circulate fluid through bag filter 98 to remove solid particles from the water, and from there to vessel 106 containing an appropriate contact media, such as iodine resin, to kill bacteria. Thus, the bacteria elimination stage is incorporated as a portion of the recycling of water through treatment tank 86.

After treatment vessels 102 and 104 react the treatment fluid with contact media, as described previously herein, the treatment fluid is passed to vessels 110, 112, 114 and 116 of the deionization section 60, as previously described relative to embodiment 40 of FIGS. 1–14.

Many modifications and variations may be made in the techniques and structures described and illustrated herein without departing from the spirit and scope of the present invention. For example, in addition to the sequential treatment of the fluid by the various stages as revealed by the embodiments of FIGS. 1 and 15, other changes might potentially be made. Additionally, aeration systems and mixing systems other than those as described and illustrated herein might advantageously be used in accordance with the method of the present invention. Accordingly, the techniques and structures described and illustrated herein are illustrative only, and should not be considered as limitations from the scope of the present invention.

I claim:

1. A fluid treatment system adapted to remove contaminants from an aqueous fluid, comprising:

an aeration section arranged to receive said aqueous fluid said aeration section comprising an air dispersal assembly for aerating said aqueous fluid and for separating lighter contaminants from said aqueous fluid;

a suspended solids removal section arranged to receive said aqueous fluid from said aeration section, said suspended solids removal section including a mixing vessel for facilitating mixture of the aqueous fluid with flocculating agents and a separation assembly for establishing a laminar flow to promote settling of solid particles; and a contact media section adapted to receive said aqueous fluid from said solids removal section, said contact media section including a plurality of contact media adapted to contact said fluid, said contact media selected to remove at least one of the contaminants present in said aqueous fluid;

wherein said sections are fluidly coupled together in a sequence.

2. A fluid treatment system adapted to remove contaminants from an aqueous fluid, comprising:

an aeration section arranged to receive said aqueous fluid and containing an air injection assembly for aerating said aqueous fluid and for separating lighter contaminants from said aqueous fluid;

a flocculating section arranged to receive said aqueous fluid, said flocculating section including a mixing vessel for facilitating mixture of the aqueous fluid with flocculating agents and a laminar flow inducing separation assembly;

an organic removal section adapted to receive said aqueous fluid, said organic removal section including a contact media adapted to contact said aqueous fluid and to remove hydrocarbons and organic contaminants present in said aqueous fluid; and a demineralization section arranged to receive said aqueous fluid, said demineralization section including a contact media selected to remove undesired minerals from said aqueous fluid; wherein the sections are fluidly coupled such that said aqueous fluid flows through each section.

3. The fluid treatment system of claim 2, wherein said aeration section comprises a generally vertical column having a relatively upper fluid inlet for receiving said aqueous fluid and a relatively lower fluid outlet for allowing the egress of said aqueous fluid, wherein air is introduced proximate a relatively lower portion of said column at a location intermediate the relatively upper fluid inlet admitting said aqueous fluid and the relatively lower fluid outlet.

4. The fluid treatment system of claim 2, wherein said mixing vessel in said flocculating section comprises means for aerating and moving said aqueous fluid and for mixing said aqueous fluid with at least one selected chemical agent.

5. The fluid treatment system of claim 2, wherein said organic removal section includes a contact media comprising carbon.

6. The fluid treatment system of claim 2, wherein said organic removal section comprises at least two stages, a first stage which comprises a first contact media and a second stage which comprises a second contact media.

7. The fluid treatment system of claim 6, wherein said second contact media comprises carbon.

8. The fluid treatment system of claim 7, wherein said second contact media comprises an iodine resin.

9. The fluid treatment system of claim 2, wherein said demineralization section comprises a first stage containing a cationic ionic exchange resin as a contact media; and a second stage comprising a anionic exchange resin as a contact media.

10. The fluid treatment system of claim 2, further comprising a water-storage vessel adapted to receive and store the aqueous fluid having been treated through all said sections.

11. A water treatment system for removing contaminants from a treatment water influent, comprising:

an aeration column for receiving said treatment water and to aerate said treatment water, said column including an air inlet for injecting flow of air through said treatment water;

a chemical reaction vessel arranged to receive the treatment water from the aeration column and mix said treatment water with at least one desired chemical to form an aqueous mixture;

a laminar flow separator assembly operably coupled to receive said aqueous mixture and configured to separate solids from said aqueous mixture yield an aqueous fluid;

a filtration system arranged to receive said aqueous fluid from said laminar flow separator assembly, said filtration system including a media for filtering remaining solids from said fluid to yield a filtered fluid;

a first contact media vessel arranged to receive said filtered fluid, said first contact media vessel containing a first contact media selected to remove selected organic contaminants from said filtered fluid; and a second contact media vessel arranged to receive said filtered fluid from said first contact media vessel, said second contact media vessel containing a second contact media, said second contact media selected to remove selected organic contaminants from said filtered fluid.

12. The water treatment system of claim 11, further comprising a source of said desired chemical with which said treatment water is mixed, and wherein said desired chemical with which said treatment water is mixed includes at least one chemical selected from the group consisting of lime, caustic soda, aluminum sulfate and bentonite.

13. The water treatment system of claim 11, further comprising a third contact media vessel arranged to receive said fluid from said second contact media vessel and to contact said fluid with a third contact media selected to remove selected contaminants from said fluid.

14. The water treatment system of claim 13, wherein said first contact media comprises carbon, wherein said second contact media comprises a cation exchange resin, and wherein said third contact media comprises an anion exchange resin.

15. A water treatment system, comprising:

a first filtration system having a filter media for receiving water to be treated and for removing particulate matter in excess of a predetermined size therefrom;

an aeration column adapted to receive filtered water from said first filtration stage and to subject said water to an upwardly percolating flow of air from an air inlet to initiate separation of relatively lighter contaminants from said water prior to discharge;

a chemical mixing vessel coupled to receive water discharge from said aeration column and comprising means to induce agitated motion to said water so as to promote mixing of said water with another substance to promote separation of solids from said water prior to discharge from said mixing vessel;

a second filtration system adapted to receive water discharge from said mixing vessel and to remove particulate matter therefrom;

a first contact media section adapted to receive water from said second filtration system, the first contact media section comprising at least one contact media selected to remove organic contaminants remaining in said water;

a second contact media section adapted to receive water from said first contact media section, the second comet media section including a second contact media comprising a contact media selected to kill bacteria;

a third contact media section adapted to receive water from said second contact media section, the third contact media section including an anion exchange resin as a a fourth contact media section adapted to receive water from said third contact media section the fourth contact media section comprising a cation exchange resin as a contact media; and a fifth contact media section adapted to receive water from said fourth contact media section the fifth contact media section comprising an anion exchange resin as a contact media.

16. The water treatment system of claim 15, further comprising a storage vessel coupled to receive water from said fifth contact media section.

17. The water treatment system of claim 15, wherein said chemical mixing vessel comprises:

means for recirculating water in said chemical mixing vessel in such a way as to aerate said water and to inject said water through a plurality of outlets into said chemical mixing vessel to subject said water to said agitated motion and to promote mixing of said water with another substance.

18. The water treatment system of claim 17, wherein said chemical mixing vessel turner comprises a recirculating filtration system adapted to receive water containing solids from said chemical mixing vessel and to circulate said water through a filter, to remove said solids, and to return said filtered water to said mixing vessel.

19. The water treatment system of claim 15, wherein said first and second filtration systems each comprise bag filters.

20. A fluid treatment system adapted to remove contaminants from an aqueous fluid, comprising:

an aeration system including an aeration column for receiving said aqueous fluid and to aerate said aqueous fluid to separate some contaminants therein from said aqueous fluid;

a suspended solids removal section comprising,
a tank coupled to receive said aqueous fluid from said aeration section,
a pump coupled to said tank to withdraw a portion of said aqueous fluid therefrom,
and to reintroduce said aqueous fluid into said tank under pressure, and
a flow separation assembly including a laminar flow inducing portion for promoting removal of suspended solids from said aqueous fluid in said tank prior to discharge of said aqueous fluid;

an organic removal section adapted to receive said aqueous fluid from said suspended solids removal section adapted to receive said aqueous fluid from said suspended solids removal section and to remove at least a portion of organic contaminants present in said aqueous fluid; and a bacteria removal section adapted to receive said aqueous fluid from said organic removal section and including a first contact media for killing bacteria therein; and a demineralization section arranged to receive said aqueous fluid from said bacteria removal section and including a second contact media for removing dissolved minerals therein.

21. The fluid treatment system of claim 20, wherein said bacteria removal section comprises:

a vessel coupled to receive and to discharge said fluid; and a contact media within said vessel, said contact media selected to kill bacteria in said fluid.

22. The fluid treatment system of claim 20, wherein said demineralization section comprises at least two vessels, each said vessel coupled to receive and to discharge said treatment fluid; a first of said vessels containing a cation exchange resin, and a second of said vessels containing an anion exchange resin.

23. The water treatment system of claim 11, wherein the aeration column further comprises a fluid inlet and a fluid outlet, the treatment water flowing in a downstream direction from the fluid inlet to the fluid outlet and wherein the gas inlet is located downstream from the fluid inlet and injects flow of gas in an upstream direction through said treatment water.

* * * * *

UNITED STATES PATENT AND TRADEMARK OFFICE
CERTIFICATE OF CORRECTION

PATENT NO. : 5,647,977
DATED : July 15, 1997
INVENTOR(S) : Johnny Arnaud

It is certified that error appears in the above-identified patent and that said Letters Patent is hereby corrected as shown below:

In Column 5, line 1, delete "prevent" and replace with --present--.
In Column 8, line 40, delete "149" and replace with --144--.
In Column 8, line 44, delete "149" and replace with --144--.
In Column 8, line 58, delete "149" and replace with --144--.
In Column 12, line 61, delete "second" and replace with --first--.
In Column 12, line 61, delete "iodine resin" and replace with --silicon based media--.
In Column 13, line 9, after "injecting" insert --a--.
In Column 13, line 12, after "and" insert --to--.
In Column 13, line 17, after "mixture" insert --to--.
In Column 14 line 7, delete "comet" and replace with --contact--.
In Column 14, line 13, after "a" insert --contact media--.
In Column 14, line 34, delete "turner" and replace with --further--.
In Column 14, line 38, after "filter" delete --,--.

Signed and Sealed this

Second Day of February, 1999

Attest:

Attesting Officer

*Acting Commissioner of Patents and Trademarks*